United States Patent

Itoh et al.

(10) Patent No.: US 7,047,407 B2
(45) Date of Patent: May 16, 2006

(54) NETWORK SYSTEM ENABLING TRANSMISSION CONTROL

(75) Inventors: Shinji Itoh, Yokohama (JP); Kunihiko Miyazaki, Yokohama (JP); Isao Echizen, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 834 days.

(21) Appl. No.: 10/074,239

(22) Filed: Feb. 14, 2002

(65) Prior Publication Data

US 2003/0105979 A1 Jun. 5, 2003

(30) Foreign Application Priority Data

Dec. 5, 2001 (JP) ............................. 2001-370824

(51) Int. Cl.
*G06F 1/26* (2006.01)
(52) U.S. Cl. ..................... 713/168; 713/200; 713/201
(58) Field of Classification Search ................ 713/168, 713/200, 201
See application file for complete search history.

(56) References Cited

U.S. PATENT DOCUMENTS

| 5,577,209 A | 11/1996 | Boyle et al. |
| 5,680,452 A | 10/1997 | Shanton |
| 5,940,591 A | 8/1999 | Boyle et al. |
| 6,317,435 B1 * | 11/2001 | Tiedemann et al. ......... 370/441 |
| 6,772,419 B1 | 8/2004 | Sekiguchi et al. |

FOREIGN PATENT DOCUMENTS

| EP | 0 743 777 A2 | 11/1996 |
| JP | 8-204701 | 8/1996 |
| JP | 10-111855 | 4/1998 |
| JP | 11-85546 | 3/1999 |
| JP | 11-149385 | 6/1999 |
| WO | WO 00/10278 | 2/2000 |

OTHER PUBLICATIONS

"Department of Defense Trusted Computer System Evaluation Criteria", DOD, 5200.28-STD, Dec. 26, 1985, pp. 1-116.

* cited by examiner

*Primary Examiner*—Thomas R. Peeso
(74) *Attorney, Agent, or Firm*—McDermott Will & Emery LLP

(57) ABSTRACT

A network system capable of preventing the leakage of a confidential file by an inadvertent act of a transmitting party and capable of meeting the requirement for an arbitrary file format is disclosed. A label indicating a security level ("confidential" or "unclassified") is attached to the file in a client terminal, which transmits the labeled file outside. A transmission management program on a gateway server checks the label of the file, and in the case where the security level is "unclassified", transmits the file to an external network. Also, a label management program manages the labeled file in the client terminal.

8 Claims, 17 Drawing Sheets

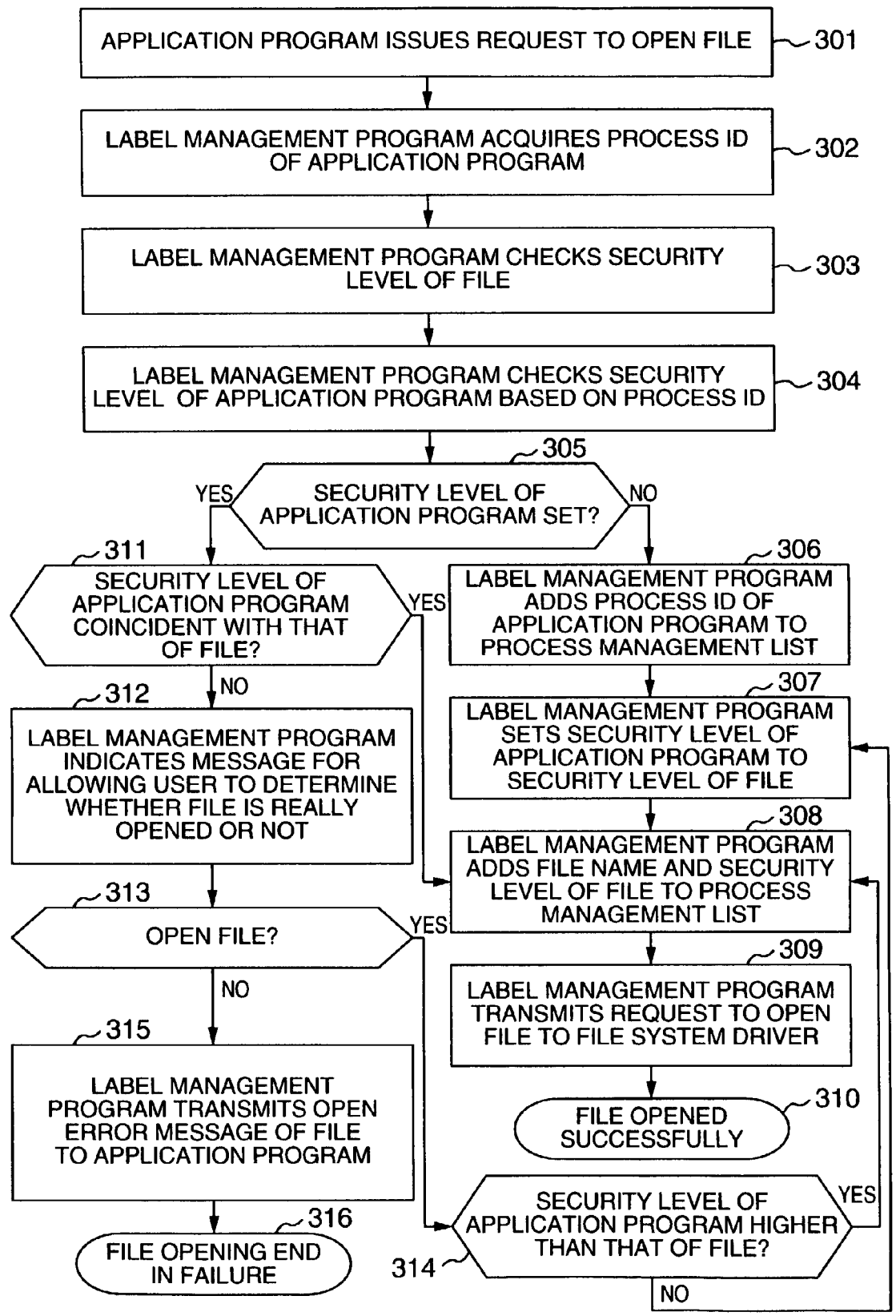

FIG. 4

| PROCESS ID | PROCESS SECURITY LEVEL | FILE NAME | FILE SECURITY LEVEL |
|---|---|---|---|
| FF053EC9 | CONFIDENTIAL | C:¥document¥file1.dat | CONFIDENTIAL |
| | | C:¥document¥file2.dat | UNCLASSIFIED |
| FF039D33 | UNCLASSIFIED | C:¥document¥file3.dat | UNCLASSIFIED |
| ... | ... | ... | ... |

501 — APPLICATION PROGRAM ISSUES REQUEST TO READ DATA FROM BYTE OFFSET 0xAB00 OF FILE

502 — LABEL MANAGEMENT PROGRAM CONVERTS BYTE OFFSET 0xAB00 TO ACTUAL BYTE OFFSET 0xAB04

503 — FILE SYSTEM DRIVER CONVERTS ACTUAL BYTE OFFSET 0xAB04 TO RELATIVE POSITION ON MAGNETIC DISK

504 — DISK DRIVER CONVERTS RELATIVE POSITION OF MAGNETIC DISK INTO PHYSICAL POSITION AND READ DATA INTO MEMORY

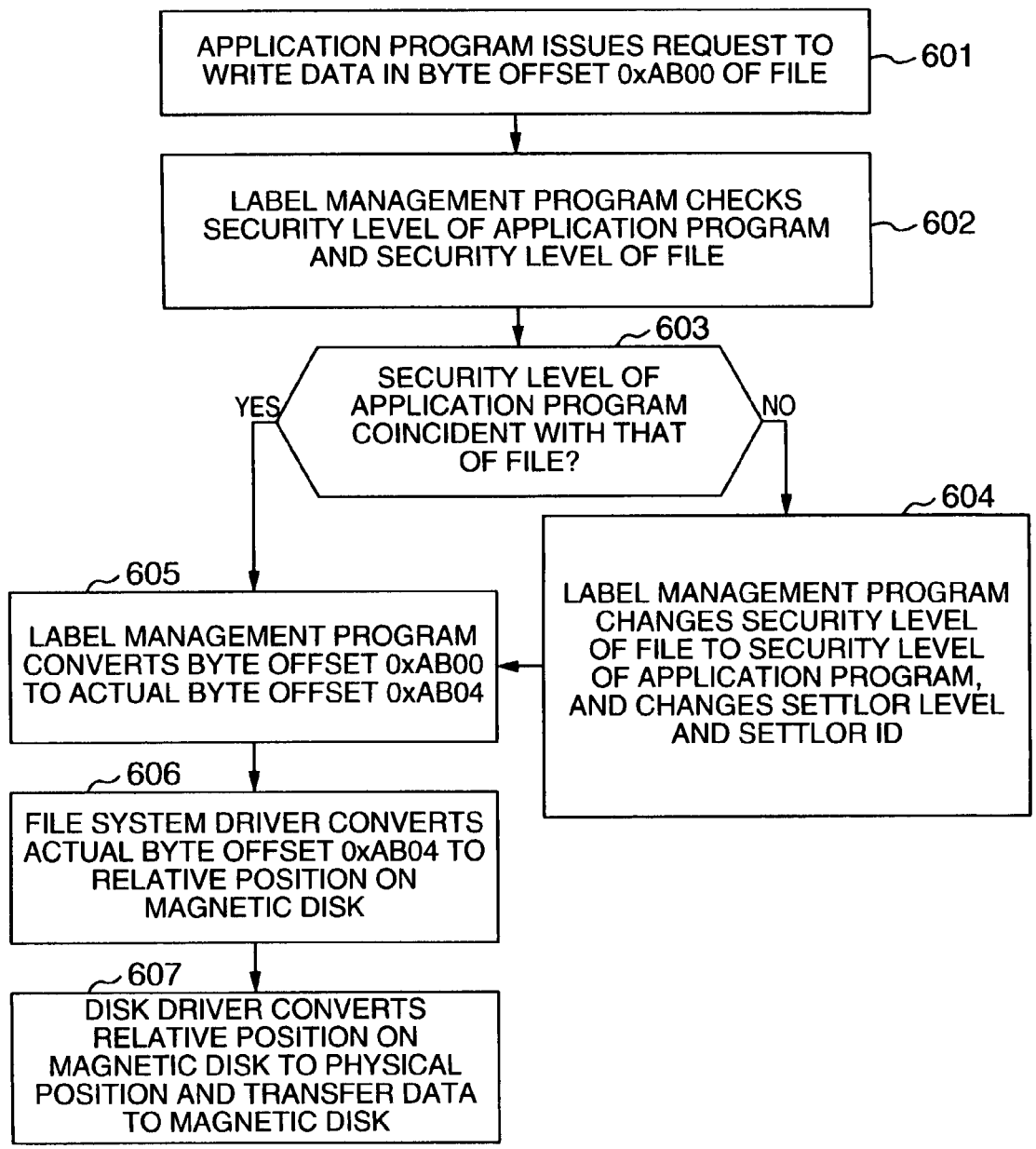

NETWORK SYSTEM ENABLING TRANSMISSION CONTROL

BACKGROUND OF THE INVENTION

The present invention relates to a technique for preventing the confidential information handled in an organization or the like from leaking outside.

The electronic data handled in an organization or the like contain lots of confidential information. On these electronic data, the word "confidential" is written in the documents intentionally to inform the viewers that the particular data are confidential. The confidential data are thus prevented from leaking outside by making the viewers conscious of the importance of leaking the data outside. Sometimes, however, the confidential data may be inadvertently or intentionally transmitted outside by mail. To cope with this problem, the server searches the mail contents using a keyword to check whether a preset keyword ("confidential", for example) is contained in the mail. In the case where the keyword is not contained in the mail, the mails are transmitted as they are while in the case where the keyword is contained in the mail, the transmission is suspended.

Some confidential information can be accessed only by executives of an organization. In order to prevent the confidential information from being accessed by unauthorized personnel, the information flow can be controlled to make the particular confidential information inaccessible from other than the executives by attaching a forcible access control function.

For detailed information on the forcible access control, refer to the reference (TCSEC) "Department of Defense Trusted Computer System Evaluation Criteria" DOD 5200.28-STD.

On the other hand, U.S. Pat. No. 5,940,591 discloses a technique for realizing a multi-level security in the network environment.

Also, JP-A-8-204701 discloses a method of preventing the confidential information from leaking to third parties by transmitting the information in encrypted form.

The system for preventing the information leakage based on the keyword search is effective for specified data formats, but not effective for other data formats and an image file containing no text information.

In a computer equipped with the mandatory access control function, the information flow can be controlled sufficiently as long as the data stay within the particular computer. Once the data transfers to another computer, however, the security level of the data, which is dependent on the transferee computer, cannot be easily guaranteed. Also, the computer having the mandatory access control function is often utilized for special applications and unable to be used for general-purpose applications. The use of such computer, therefore, hardly extends to unclassified companies and organization.

U.S. Pat. No. 5,940,591 described above poses such problems as: (1) the access control is provided for each user but not for each file, and (2) the requirement for making inquiry at a security manager each time of transmission results in a heavy load.

In the case where data are transmitted in encrypted form, on the other hand, the data are encrypted at an employee's terminal, and therefore the employee is required to be informed which data is confidential. As a result, the confidential data may be inadvertently transmitted without being encrypted.

SUMMARY OF THE INVENTION

The present invention provides a technique for preventing the confidential information of an organization from being transmitted inadvertently by an employee in charge of data transmission.

The invention further provides a system capable of using the technique described above with an arbitrary data format.

The invention further provides a technique whereby the security level ("confidential" or "unclassified") of data is maintained in the data transfer within an organization and is usable for an arbitrary data format.

Specifically, additional information indicating the attribute of the information proper (data body) is attached to the information proper (data body), and the transmission and receipt of the information proper are controlled using the particular additional information.

More specifically, a label (additional information) indicating the attribute is attached to each data body (information proper), so that the data with the label are handled within the organization. The attribute includes a security level ("confidential" or "unclassified"), for example. In the case where the data are transmitted outside, this label is checked by a transmission control program on a gateway server, which decides whether the data can be transmitted outside or not, and in the case where the data is transmissible outside, removes the label from the data and transmits the data body outside. On the other hand, the gateway server that has received a data body from outside attaches a label to the data body and transmits the data to the address in the organization.

At a terminal used by a user, a label may not be attached directly on the data body but the security level information of each data may be written in another file. In the case where the data body is transmitted from a client terminal, a label indicating the security level of the data body is attached by referring to the file and the labeled data is transmitted.

By attaching a signature to the label, the chance of illegal alteration of the label is reduced while at the same time making it possible to identify the party who has set the security level.

According to the invention, there is also provided a technique for preventing the illegal alteration or destruction of the label by the bug of an application program or a device driver or the operating error on the part of the user. Specifically, a multi OS (operating system) control technique is used to execute two operating systems in such a manner that one operating system is made available for use by the user while the other operating system is exclusively used for label management.

According to this invention, as compared with the US patent described above, (1) the access to each data can be controlled by an access control list, and (2) since the access control list is located within each user terminal, no inquiry is required each time.

Other objects, features and advantages of the invention will become apparent from the following description of the embodiments of the invention taken in conjunction with the accompanying drawings.

BRIEF DESCRIPTION OF THE DRAWINGS

FIG. 3 is a flowchart for performing of opening a file.

FIG. 4 is a diagram showing a process management list.

FIG. 5 is a flowchart for performing the process of reading from a file.

FIG. 6 is a flowchart for performing the process of writing into a file.

DESCRIPTION OF THE EMBODIMENTS

The disclosures of all articles and references, including patent documents, mentioned in the application are incorporated herein by reference for all purposes.

First Embodiment

A first embodiment of the invention will be explained. According to this embodiment, a label indicating a security level is attached to the head of the data stored in a file. The information flow is controlled using this label information. The contents and the number of the security level and the number of level can be set freely for each system. The description that follows refers to two levels including "confidential" and "unclassified". This label may or may not be attached to a file depending on the type of the file. No label is attached to the system file and the driver file, for example, while the label is attached to an application data file. The manner in which a file with no label attached thereto is determined in advance as a system policy. According to this embodiment, any files with no label attached thereto are handled as "unclassified" data at a client terminal.

Figure 1:
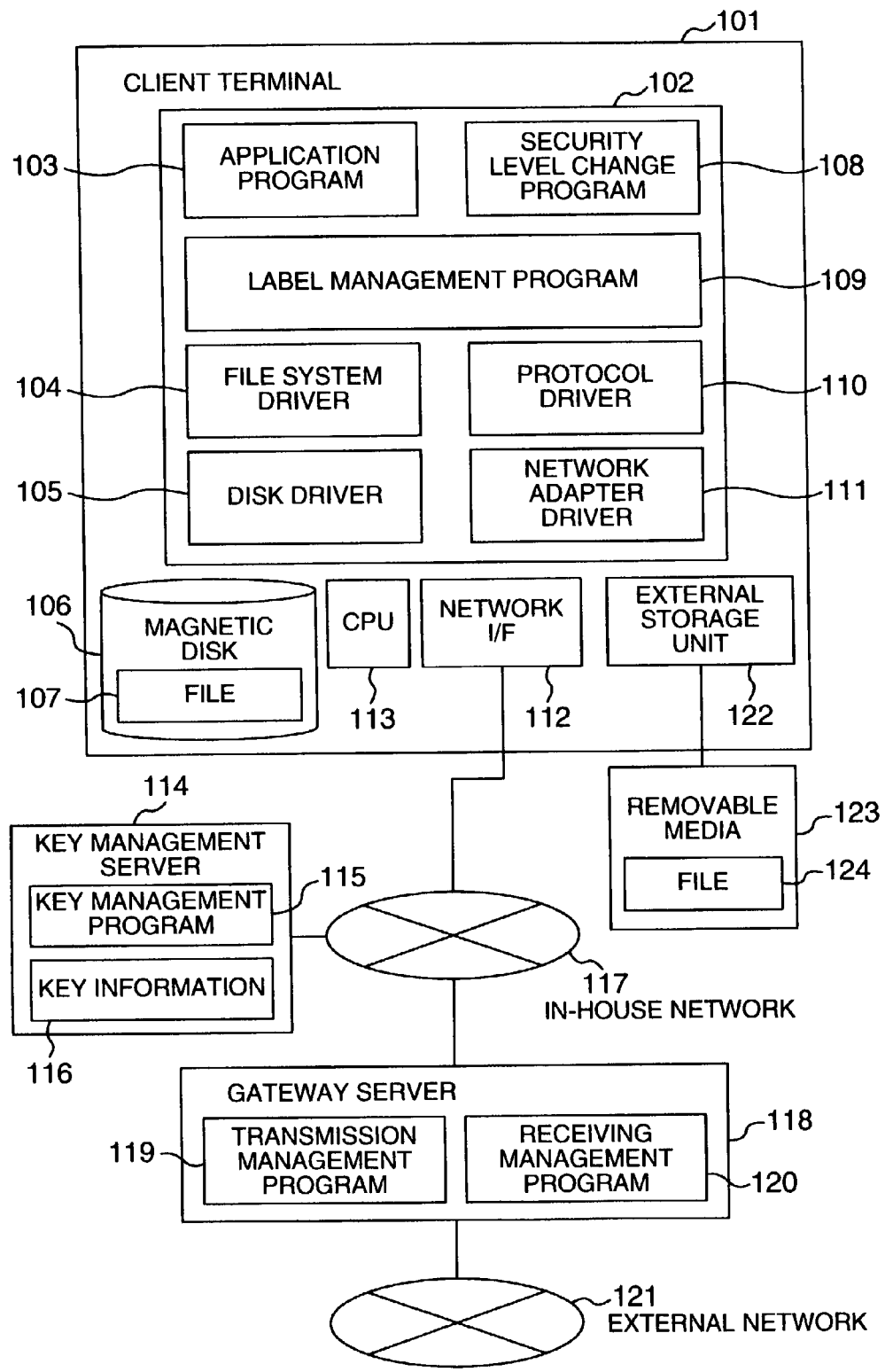
FIG. 1 is a diagram showing the whole network system according to the invention.

FIG. 1 shows an example of a configuration of the system according to this embodiment. At least one client terminal 101, a gateway server 118 and a key management server 114 are connected to an in-house network 117. Further, the gateway server 118 is connected to an external network 121. The client terminal 101 includes a CPU 113, a memory 102, a magnetic disk 106, a network I/F 112 and an external storage unit 122. The memory 102 has loaded thereon a label management program 109, a file system driver 104, a disk driver 105, a protocol driver 110, a network adaptor driver 111, an application program 103 and a security level change program 108. Each of these programs is operated under the control of an operating system (OS).

A plurality of files 107 are stored in the magnetic disk 106. The external storage unit 122 is a device for reading or writing data from or into the file 124 in removable storage media (hereinafter referred to as removable media) 123. The external storage unit includes, for example, a floppy disk drive or a CD-ROM device. A transmission management program 119 and a receiving management program 120 are operating in the gateway server 118. The key management server 114 includes key information 116 and has a key management program 115 operating therein. The client terminal 101 transmits a labeled file onto the network, and the gateway server 118 checks the label of the labeled file to determine whether the particular labeled file should be transmitted or not outside.

Each program in each embodiment may be introduced into the memory 102 from the magnetic disk 106, the removable media, or other servers connected to a network in or outside an organization.

Figure 2:
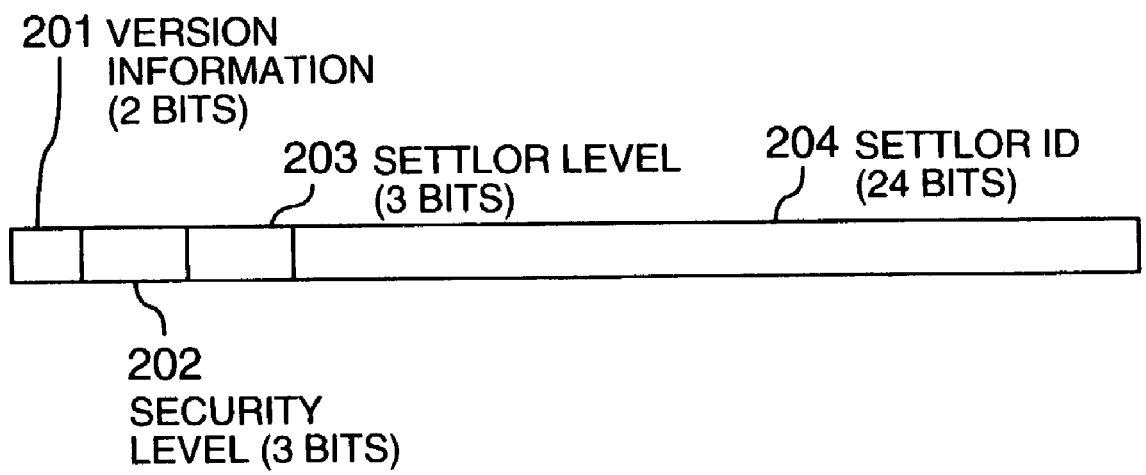
FIG. 2 is a diagram showing a label format.

FIG. 2 shows an example of a label format according to this embodiment. The label is located at the head of the file 107 and has information of 32 bits (4 bytes). Of the 32 bits, the first two bits represents the version information 201 for the label format, the next three bits the security level 202 of the filed 107, the following next three bits the settlor level 203 for setting the security level of the file 107, and the remaining 24 bits the settlor ID 204 who has set the security level of the file 107. The security level 202 includes "unclassified" and "confidential", and the settlor level 203 includes, for example, "employee", "group leader", "section manager" and "department manager". The format and the size of the label may be varied from one organization to another depending on the number of the security levels 202, the size of the organization or other information to be added. The other information includes, for example, the term of validity of the label, the information on the person who has generated the file 107 and the access control information (the read-only information, etc.). The access can be controlled using various information other than the security level 202.

The label management program 109 is for managing the label of the file 107. In the case where the application program 103 accesses the file 107, the label is removed and data (data body) other than the label is delivered to the application program 103. In the case where the application program 103 transmits the file 107 to the in-house network 117 through the network I/F 112, on the other hand, the label management program 109 transmits the file 107 with the label.

FIG. 3 is a flowchart for performing the process of opening the file 107 located on the magnetic disk 106. "To open the file" is a pre-process making possible the operations including the reading of data in the file or the writing of data in the file.

In step 301, the application program 103 issues a request for opening the file 107 to the label management program 109 through the I/O manager of the operating system.

In step 302, the label management program 109 acquires the process ID of the application program 103 through the I/O manager. The process is a unit of executing a program managed by the operating system and the process ID is defined as an identifier of the process.

In step 303, the label management program 109 checks the security level 202 of the file 107. In the case where no label is attached to the file 107, the particular file 107 is determined as an "unclassified" file. Examples lacking the label are a system file and a driver file.

In step 304, the label management program 109 checks the security level of the application program 103 from the process ID. The label management program 109 checks the security level of the application program 103 by referring to the process management list 400 shown in FIG. 4. As of the time point when the file 107 is not yet opened by the application program 103, the security level of the application program 103 is not yet set.

The requirements for the security level (the security level of the process in execution) of the application program are as follows. Specifically, the application program 103 itself can handle files of various security levels. In the case where confidential files and unclassified files are handled at the same time, the confidential information may be written in an unclassified file (such as cut and paste). According to this embodiment, this risk is avoided by utilizing the security level of the process.

FIG. 4 shows a process management list 400. The first column shows the process ID 401, the second column the security level 402 of the particular process (security level of the application program), the third column the name 403 of the file opened, and the fourth column the security level 404 of the particular file 107. The process management list 400 is prepared and initialized by a label management program 109 at the time of loading the label management program 109. Also, the label management list 400 is updated by the label management program 109.

In step 305, the label management program 109 checks whether the security level 402 of the application program 103 has been set or not, and in the case where it has been set, the process proceeds to step 311, otherwise the process is passed to step 306.

In step 306, the label management program 109 adds the process ID of the application program 103 to the process management list 400.

In step 307, the label management program 109 sets the process security level 402 of the application program 103 to the security level 202 of the file 107.

In step 308, the label management program 109 adds the file name 403 and the security level 202 of the particular file 107 to the process management list 400.

In step 309, the label management program 109 transmits a request to the file system driver 104 to pen the file 107.

In step 310, the file is successfully opened.

In step 311, the label management program 109 checks whether the security level 402 of the application program 103 is coincident with the security level 202 of the file 107. In the case where they are coincident, the process proceeds to step 308, otherwise the process proceeds to step 312.

In step 312, the label management program 109 displays a message for causing the user to determine whether the file 107 is really to be opened or not.

In step 313, the user decides whether the file 107 is opened or not. In the case where the user decides to open the file 107, the process proceeds to step 314, while in the case where the user decides not to open the file 107, the process proceeds to step 315.

In step 314, the label management program 109 checks whether the security level 402 of the application program 103 is higher than the security level 202 of the file 107. In the case where the security level 402 of the application program 103 is higher, the process proceeds to step 308, otherwise the process proceeds to step 307.

In step 315, the label management program 109 transmits the open error message of the file 107 to the application program 103.

In step 316, the file fails to be open.

According to this embodiment, the application program 103 can always open the file 107 depending on the designation by the user. In the case where the security level 402 of the application program 103 is not coincident with the security level 202 of the file 107 in step 311 of FIG. 3, however, the process may proceed to step 315 thereby to forcibly reject the file open request.

Also, at the time of preparing a new file, the user selects the security level 202 of the same file. In the standard setting, the security level 202 of the file is set equal to the security level 402 of the application program 103. In the case where the security level 402 of the application program 103 is "not yet set", on the other hand, the highest "confidential" level is desirably selected.

FIG. 5 is a flowchart for performing the process of reading data from the file 107 according to this embodiment. In this case, an explanation will be made about a case in which the application program 103 reads the byte offset 0X AB00 providing an address from the head of the file 107, where 0X indicates a hexadecimal notation.

In step 501, the application program 103 issues a request to read the data from the byte offset 0X AB00 of the file 107.

In step 502, the label management program 103 converts the byte offset 0X AB00 to the actual byte offset 0X AB04. According to this embodiment, the file 107 carries the information (label) of four bytes (32bits) at the head of the file 107. Since the application program 103 is not informed of the presence of the label, however, the byte offset which the application program 103 requests to read is required to be adjusted. As a result, according to this embodiment, a value obtained by adding four bytes, i.e. the byte length of the label information to the byte offset requested by the application program 103 constitutes the actual byte offset.

In step 503, the file system driver 104 converts the actual byte offset 0X AB04 to the relative position on the magnetic disk 106.

In step 504, the disk driver 105 converts the relative position of the magnetic disk 106 to a physical position and reads the data into the memory 102.

FIG. 6 is a flowchart for performing the process of writing the data in the file 107 according to this embodiment. As an example, an explanation will be made about a case in which the application program 103 writes into a specific byte offset 0X AB00 of the file.

In step 601, the application program 103 issues a request to write the data in the byte offset 0X AB00 of the file 107.

In step 602, the label management program 109 checks the security level 402 of the application program 103 and the security level 202 of the file 107.

In step 603, the label management program 109 checks whether the security level of the application program 103 is coincident with that of the file 107. In the case where they are coincident with each other, the process proceeds to step 605, otherwise the process proceeds to step 604.

In step 605, the label management program 109 converts the byte offset 0X AB00 to the actual byte offset 0X AB04. As in the case where the application program 103 reads the data of the file 107 as described above, a value obtained by adding four bytes to the byte offset requested by the application program 103 constitutes an actual byte offset.

In step 606, the file system driver 104 converts the actual byte offset 0X AB04 to the relative position on the magnetic disk 106.

In step 607, the disk driver 105 converts the relative position on the magnetic disk 106 to a physical position and transfers the data to the magnetic disk 106.

In step 604, the label management program 109 changes the security level 202 of the file 107 to the security level 402 of the application program 103, and further changes the settlor level 203 and the settlor ID 204, followed by proceeding to step 605. According to this embodiment, the security level 202 of the file 107 is changed to the security level 402 of the application program 103 forcibly in step 604. As an alternative, however, a message may be displayed to permit the user to select the security level 202 of the file 107.

According to this embodiment, the external storage unit 122 is arranged at the client terminal 101, so that the data can be transferred to another terminal using the removable media 123. As a result, the information is liable to leak out through the removable media. Thus, the data in the removable media 123 is required to be protected from an illegal access from an external source.

Figure 7:
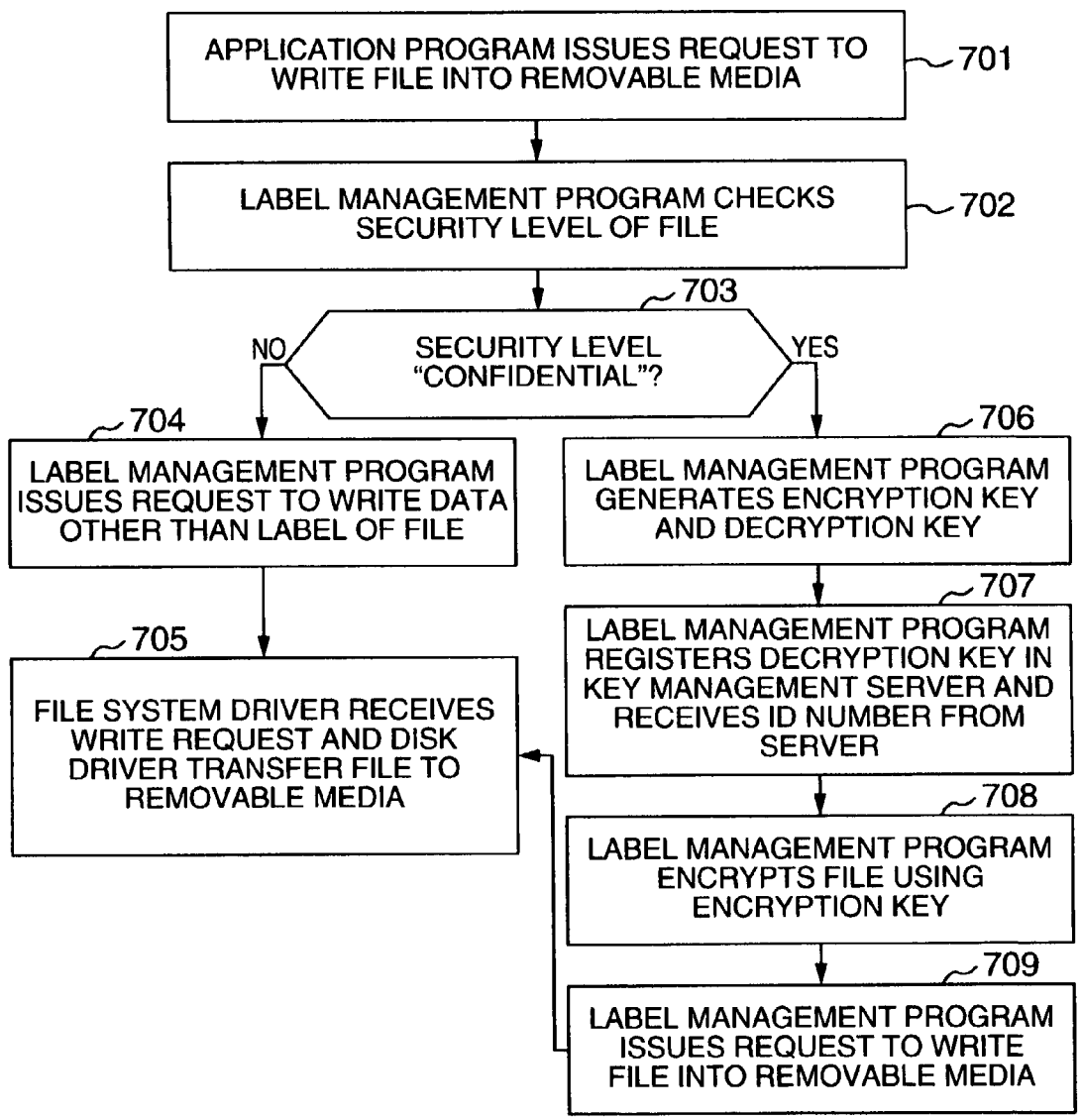
FIG. 7 is a flowchart for performing the process of writing a file into removable media.

FIG. 7 is a flowchart for performing the process of writing the file 107 into the removable media 123 according to this embodiment. In this case, an explanation will be made about a case in which the application program 103 prepares a file 124 anew and the data of the file 107 is copied to the file 124 thus prepared. The security level of the file 124 is set by the application program 103 when the data is written in the file 124.

In step 701, the application program 103 issues a request to write the data of the file 107 into the file 124 in the removable media 123.

In step 702, the label management program 109 checks the security level 202 of the file 107.

In step 703, whether the security level 202 of the file 107 is "confidential" or not is checked, and in the case where the security level 202 is "unclassified", the process proceeds to step 704, while in the case where the security level is "confidential", the process proceeds to step 706.

In the case where the security level 202 is "unclassified", the label management program 109 issues a request to write the data other than the label of the file 107 into the file 124 in the removable media 123 in step 704.

In step 705, the write request is received by the file system driver 104, and the data of the file 107 is transferred to the removable media 123 by the disk driver 105.

In the case where the security level 202 is "confidential", an encryption key and a decryption key are generated by the label management program 109 in step 706. The encryption key and the decryption key may be identical to each other.

In step 707, the label management program 109 registers the decryption key in the key management server 114 and receives an identifier (ID number, for example) from the key management server 114.

In step 708, the label management program 109 encrypts the file 107 using the encryption key, and prepares an encryption file. The encryption file includes the ID number and the encrypted data. The ID number is added by the label management program 109 at the time of preparing the encryption file.

In step 709, the label management program 109 issues a request to write the data of the encryption file into the file 124 in the removable media 123, and the process proceeds to step 705.

In the case where the encrypted data in the existing file 124 is updated, the label management program 109 transmits the ID number contained in the file 124 to the key management server 114, and receives the encryption key from the key management server 114. The label management program 109 encrypts the data using the encryption key thus received, and writes the encrypted data in the file 124.

Figure 8:
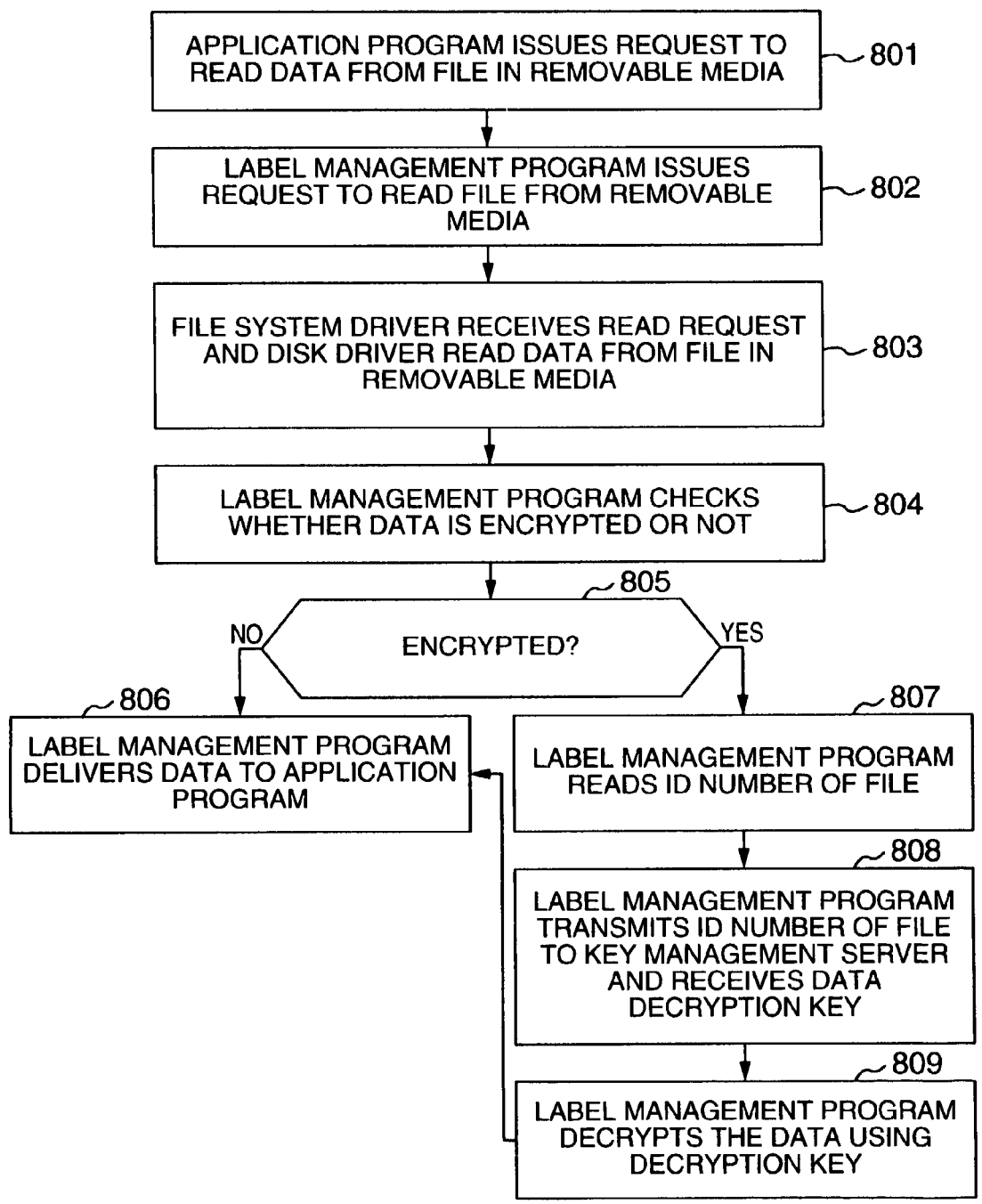
FIG. 8 is a flowchart for performing the process of reading a file from removable media.

FIG. 8 is a flowchart for performing the process of reading the data from the file 124 in the removable media 123.

In step 801, the application program 103 issues a request to the label management program 109 to read the data from the file 124 in the removable media 123.

In step 802, the label management program 109 issues a request to the file system driver 104 to read the data from the file 124 in the removable media 123.

In step 803, the file system driver 104 receives the read request, and the disk driver 105 reads the data from the file 124 in the removable media 123.

In step 804, the label management program 109 receives the data thus read out, and checks whether the particular data is encrypted or not.

In the case where the data is not encrypted, the process proceeds from step 805 to step 806, while in the case where the data is encrypted, the process proceeds to step 807.

In step 806, the label management program 109 delivers the data to the application program 103.

In step 807, the label management program 109 reads the ID number of the file 124.

In step 808, the label management program 109 transmits the ID number of the file 124 to the key management server 114, and receives the decryption key for the file 124.

In step 809, the label management program 109 decrypts the encrypted data using the decryption key, and the process proceeds to step 806.

The data for the communication between the client terminal 101 and the key management server 114 in step 808 may be encrypted.

In the case where the data of the file 124 on the removable media 123 is copied or transferred to the file 107 of the magnetic disk 106 with no label attached to the file 124, the label management program 109 attaches the label "unclassified" to the file 124 and stores it in the magnetic disk 106.

Figure 9:
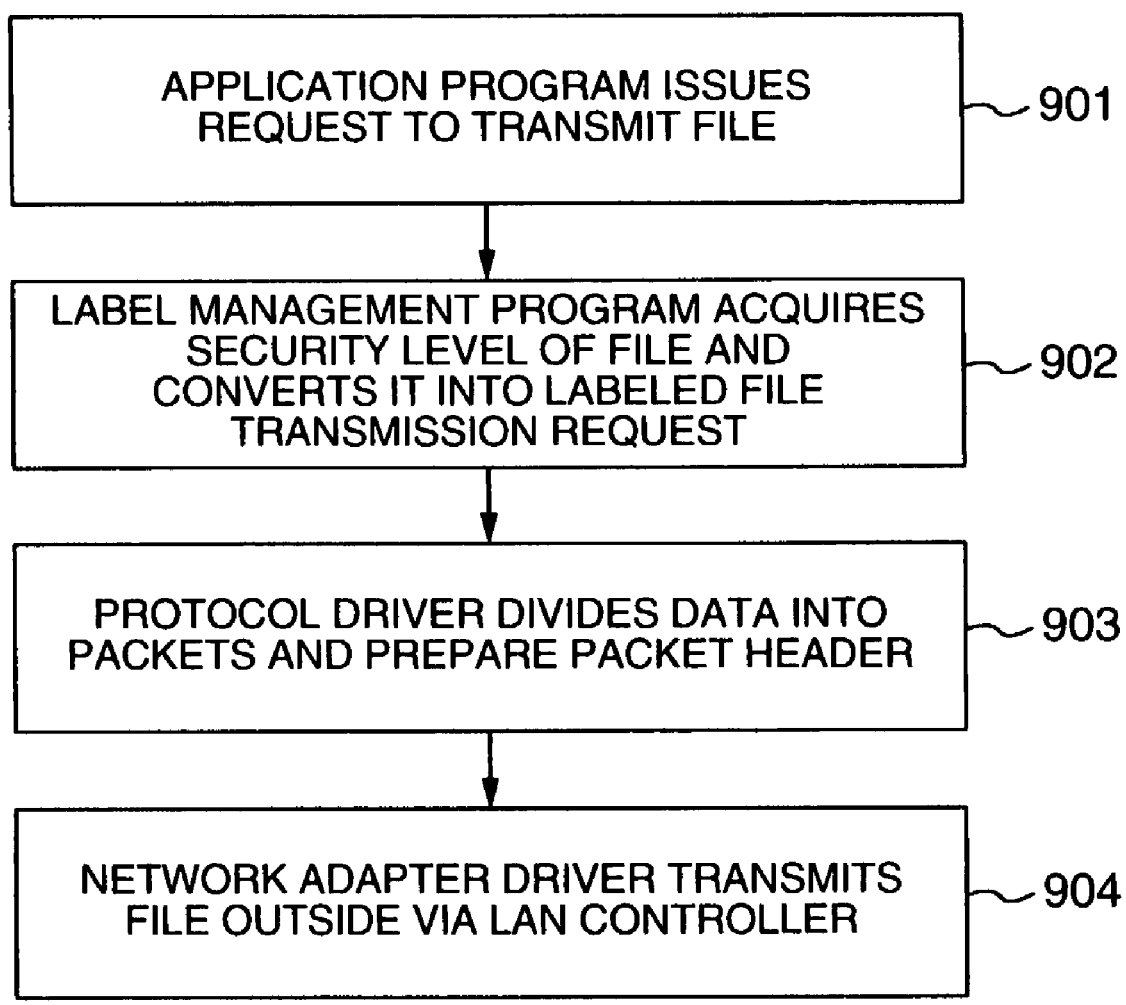
FIG. 9 is a flowchart for performing the process of transmitting a file onto a network.

FIG. 9 is a flowchart for the application program 103 performing the process of transmitting the file to the network 117.

In step 901, the application program 103 issues a request to transmit the file with a label.

In step 902, the label management program 109 acquires the security level 202 of the file 107, and converts it to a request to transmit a labeled file. The application program 103 outputs an unlabeled file data as data to be transmitted, and therefore the label management program 109 converts it to a labeled file.

In step 903, the protocol driver 110 divides the labeled file into packets, and prepares a packet header.

In step 904, the network adapter driver 111 transmits the file 107 outside through a LAN controller.

Figure 10:
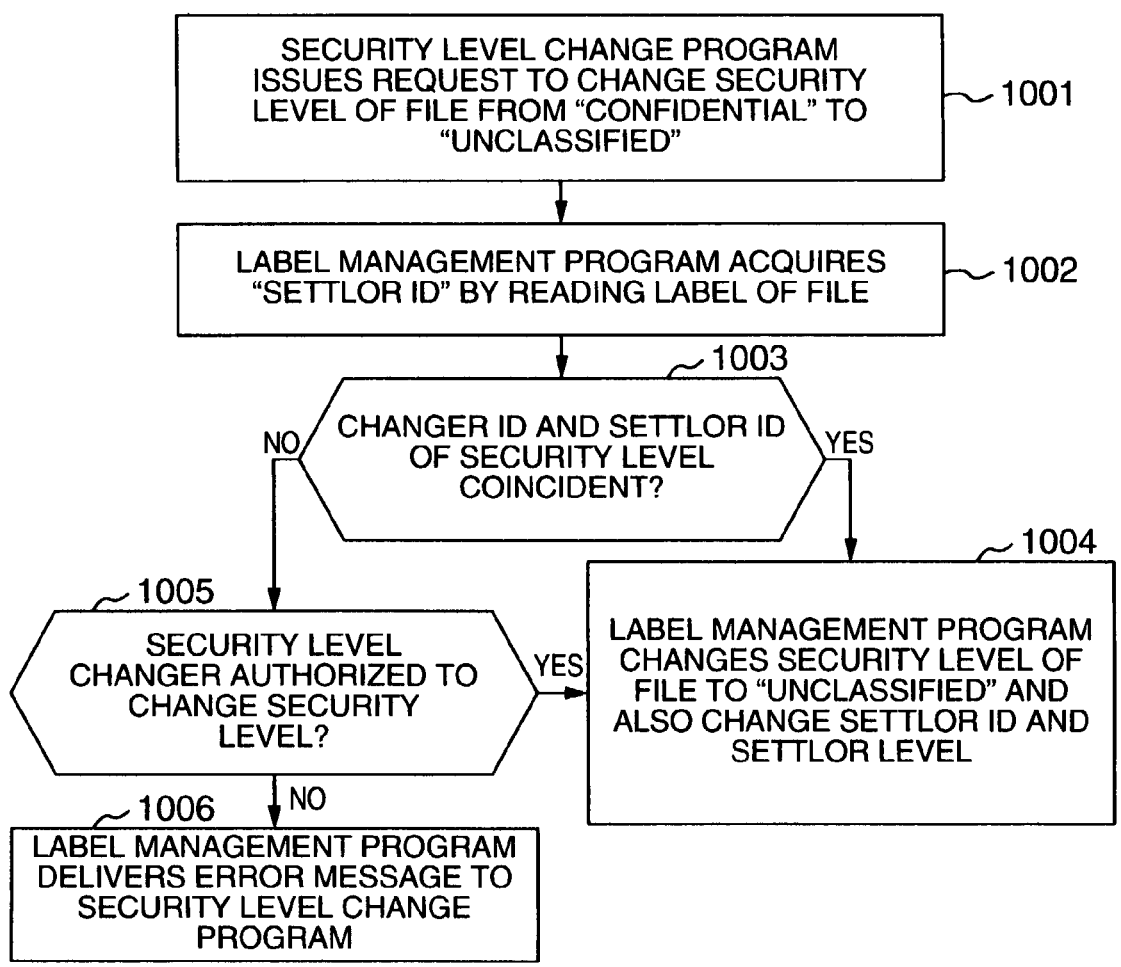
FIG. 10 is a flowchart for performing the process of changing the security level.

Now, the security level change program 108 will be explained. The security level change program 108 is for changing the security level 202 of the file 107. FIG. 10 is a flowchart for performing the process of changing the "confidential" file 107 to an "unclassified" file.

In step 1001, the security level change program 108 issues a request to change the security level 202 of the file 107 from "confidential" to "unclassified".

In step 1002, the label management program 109 acquires the settlor ID 204 by reading the label of the file 107.

In step 1003, it is determined whether the settlor ID 204 acquired in step 1002 is coincident with the changer ID of the security level 202. In the case of coincidence, the process proceeds to step 1004, otherwise the process proceeds to step 1005.

In step 1004, the label management program 109 changes the security level 202 of the file 107 to "unclassified", while at the same time changing the settlor ID 204 and the settlor level 203.

In step 1005, it is determined whether the changer of the security level 202 is authorized to change the security level 202 or not. If the answer is affirmative, the process proceeds to step 1004, otherwise the process proceeds to step 1006.

In step 1006, the label management program 109 delivers an error message to the security level change program 108.

In step 1005, the authorization to change the security level 202 means the authorization to change the security level 202 forcibly. This authorization can be set in such a manner that the change is possible in the case where the level granted an authorized person intending to change the security level 202 is higher than the settlor level 203 of the file 107. Also, it is possible to set the authorization in such a manner that even a person authorized to change the security level 202 cannot change the security level 202 of all the files 107 unconditionally but may or may not change it depending on the settlor ID 204. Alternatively, the policy of the authorization to change the security level 202 may be set dividedly for each organization. The foregoing description concerns a case in which the security level 202 is changed from "confidential" to "unclassified". Nevertheless, three or more security levels 202, if any, can be reduced by a similar method.

The security level change program 108 can also increase the security level 202 from the "unclassified" file 107 to the "confidential" file 107. Taking into consideration that the information leakage can be prevented by increasing the security level 202, an arrangement can be made so that every person can unconditionally perform the operation of increasing the security level 202.

Figure 11:
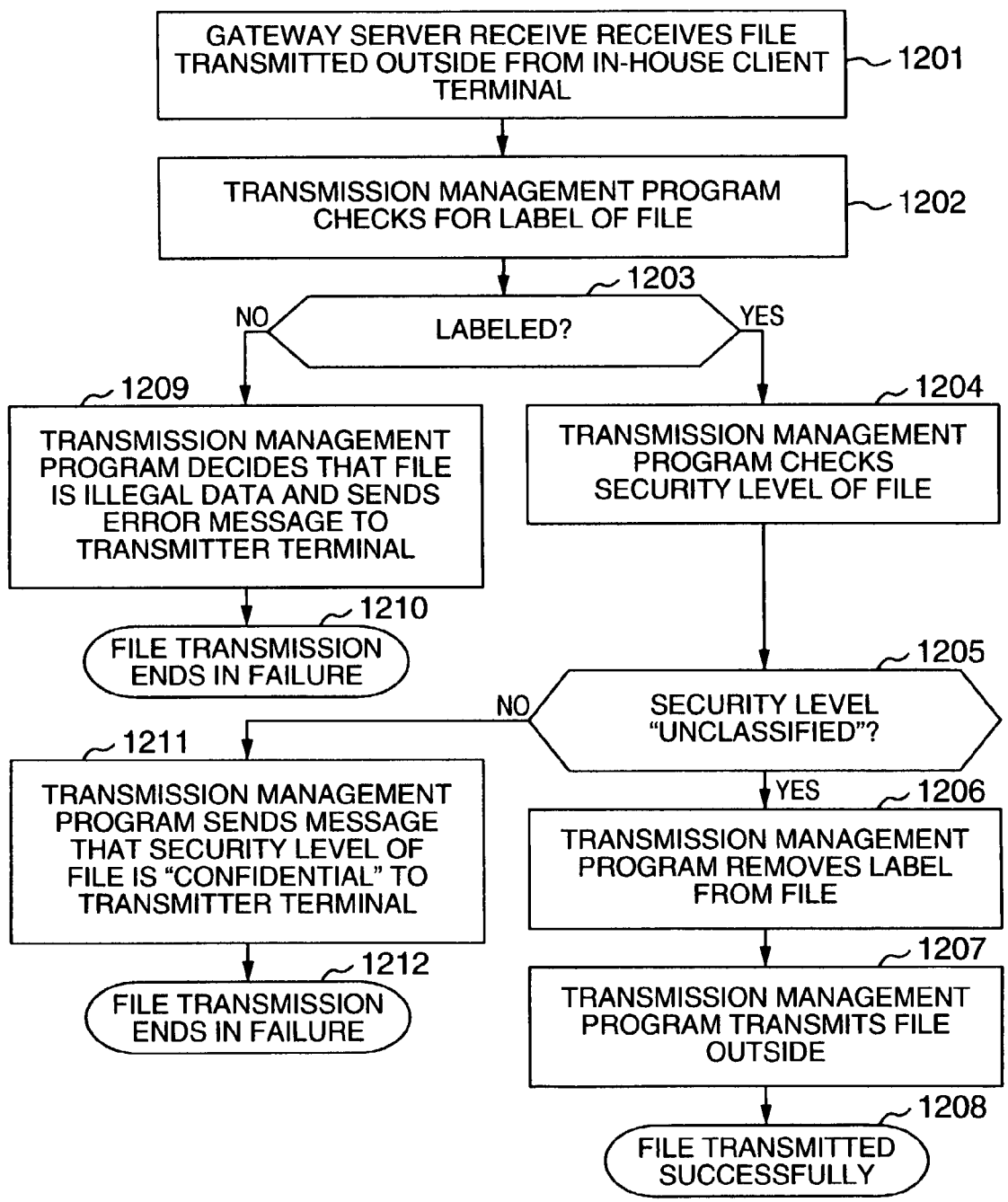
FIG. 11 is a flowchart for performing the process of checking the label at a gateway server.

The transmission management program 119 checks the label of the file 107 to be transmitted to the external network 121 by the client terminal 101 and determines whether the particular file 107 is to be transmitted or not. FIG. 11 is a flowchart for performing the process of checking the label.

In step 1201, the gateway server 118 receives the file 107 to be transmitted to the external network 121 from the in-house client terminal 101.

In step 1202, the transmission management program 119 decides whether a label is attached to the file 107 or not.

In the case where the label is so attached, the process proceeds from step 1203 to step 1204, otherwise the process proceeds to step 1209.

In step 1204, the transmission management program 119 checks the security level 202 of the file 107.

In the case where the security level 202 of the file 107 is "unclassified", the process proceeds from step 1205 to step 1206, otherwise the process proceeds to step 1211.

In step 1206, the transmission management program 119 removes the label from the file 107.

In step 1207, the transmission management program 119 transmits the file 107 outside.

In step 128, the file is transmitted successfully.

In step 1209, the transmission management program 119 determines that the file 107 is illegal data, and sends an error message to the transmitter terminal and the device used by the system manager.

In step 1210, the file transmission ends in failure.

In step 1211, the transmission management program 119 sends to the transmitter terminal a message to the effect that the security level 202 of the file 107 is "confidential".

In step 1212, the file transmission ends in failure.

In step 1206, the label is removed in order to follow the policy that the label can be interpreted only for other systems and terminals to which the system according to this embodiment is introduced. According to this embodiment, therefore, although the label is removed when the file is transmitted outside, the label can otherwise be handled as long as other policies are followed.

Also, according to this embodiment, with regard to the data transmitted outside of an organization, the label is removed after determining whether the data is to be transmitted to the external network 121 on the gateway server 118. Therefore, the embodiment can be utilized transparently also for the external network 121.

Also, the gateway server 118 is provided with a permitted transmittee list, so that the file 107 can be transmitted to any external transmittee described in the permitted transmittee list even in the case where the security level 202 is "confidential". In such a case, the transmission management program 119 encrypts the file 107 and transmits the file 107 without removing the label. Further, the transmission management program 119 records the transmitter, the transmittee and the transmission file in a log. The encryption key is registered in the key management server 114 in the same manner as in the case where the file 107 is written in the removable media. The file 107 transmitted this way has an ID number and the encryption data.

Now, an explanation will be given of the process performed in the case where the gateway server 118 receives the file 107 from the external network 121.

First, the gateway server 118 receives the file 107 transmitted toward the client terminal 101 from the external network 121.

Then, the receiving management program 120 attaches the "unclassified" label to the file 107. Also, the settlor ID 204 is set as the ID for the gateway server 118, and the settlor level 203 is set to the lowest level.

After that, the receiving management program 120 transmits the file 107 to the client terminal 101.

The receiving management program 120 may have the function of receiving the labeled file 107. In such a case, the receiving management program 120, after confirming that the label is attached, transmits the file 107 to the client terminal 101.

The authentication can be granted each other between terminals in the in-house network 117 (between the client terminals 101 or between a client terminal 101 and the gateway server 118). The authentication between the terminals (101, 118, 114) is carried out by each terminal referring to a list (the communication permission list) held by it, which describes the MAC (Media Access Control) addresses of the terminals with which communication is permitted by each terminal. Each terminal can thus be controlled to carry out the communication only with a party whose MAC address (or the IP address) is found in the communication permission list. Alternatively, the communication between terminals can be permitted based not on the authentication granted by each terminal but on the authentication determined by an authentication server provided for this purpose. In such a case, each terminal conducts communication with another terminal through the authentication server. Also, the authentication between terminals may be granted using the public key encryption system.

Further, the authentication server may check the labels of all the files transmitted or received by the client terminal 101 in communication with the parties in or outside an organization. Within each organization, the file 107 may or may not be accessible depending on the title of an employee or the department of the organization to which the employee belongs. Even in such a case, the information flow can be controlled by the authentication server checking the labels.

Second Embodiment

A second embodiment of the invention will be explained. According to the first embodiment, a label indicating the security level 202 of the file 107 is attached to the file 107. In the second embodiment, on the other hand, the information flow is controlled using a security level control list 1400 set in the client terminal 101 without attaching the label to the file 107 in the client terminal 101, and in the case where the file 107 is sent out of the client terminal 101, the label is attached to it. The format of the label attached to the file 107 sent out of the client terminal 101 is similar to that for the first embodiment.

Figure 12:
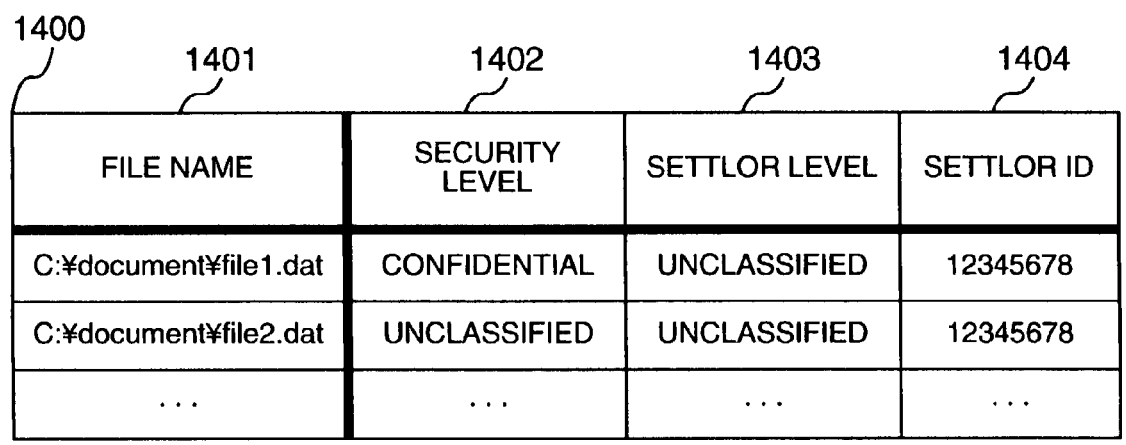
FIG. 12 is a diagram showing a format of a security level control list.

FIG. 12 shows the security level control list 1400 according to this embodiment. The first column represents a file name 1401, the second column a security level 1402 of the file 107, the third column a settlor level 1403 of the file 107, and the fourth column a settlor ID 1404 of the file 107.

An explanation will be given of the manner in which the application program 103 accesses the file 107 in the magnetic disk 106 in this embodiment. Unlike in the first embodiment, the file 107 according to this embodiment is not labeled, and therefore the byte offset requested by the application program 103 is not required to be processed. For reading from the file 107, the label management program 109 delivers the byte offset requested by the application program 103, directly to the file system driver 104.

For the operation of writing into the file 107, on the other hand, the same process as in FIG. 6 is performed except for the byte offset processing. Specifically, in response to the request of the application program 103 to write into the file 107, the label management program 109 checks to see whether the security level 402 of the application program 103 is coincident with the security level 202 of the file 107, and in the case of incoincidence, sets the security level 202 of the file 107 forcibly to the security level 402 of the application program 103, while in the case of coincidence, transmits the request to write into the file 107 to the file system driver 104.

Figure 13:
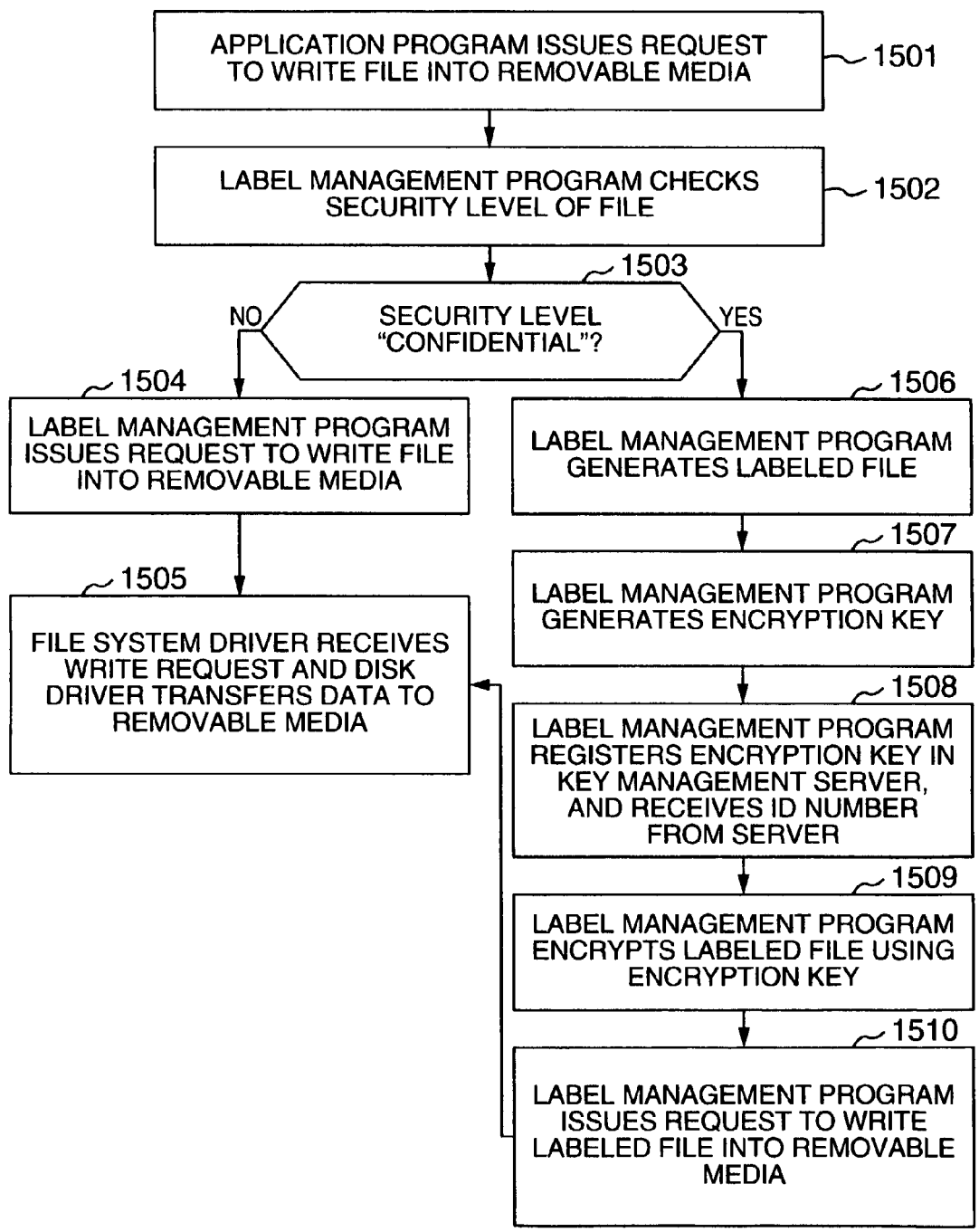
FIG. 13 is a flowchart for performing the process of writing a file into removable media according to a second embodiment of the invention.

FIG. 13 is a flowchart for performing the process of writing data into the file 107 of the removable media 123.

In step 1501, the application program 103 issues a request to write the data of the file 107 into the file 124 in the removable media 123.

In step 1502, the label management program 109 checks the security level 202 of the file 107.

In step 1503, whether the security level 202 is "confidential" or not is confirmed, and in the case where the security level 202 is "unclassified", the process proceeds to step 1504. In the case where the security level 202 is "confidential", on the other hand, the process proceeds to step 1506.

In the case where the security level 202 is "unclassified", the label management program 109 issues a request to write the data of the file 107 into the file 124 in the removable media 123 of the file 107 in step 1504.

In step 1505, the file system driver 104 receives the write request, and the disk driver 105 transfers the data of the file 107 to the removable media 123.

In the case where the security level 202 is "confidential", the label management program 109 prepares a labeled file 107 in step 1506.

In step 1507, the label management program 109 generates an encryption key.

In step 1508, the label management program 109 registers the encryption key in the key management server 114 and receives an ID number from the server.

In step 1509, the label management program 109 encrypts the labeled file 107 using the encryption key thereby to prepare an encryption file. The encryption file includes an ID number and encrypted data. The ID number is added when the label management program 109 prepares the encryption file.

In step 1510, the label management program 109 issues a request to write the data of the labeled encryption file into the file 124 of the removable media 123, and the process proceeds to step 1505.

According to this embodiment, the data is read from the file 124 in the removable media 123 in the same manner as in the first embodiment, as shown in FIG. 8. Also, in copying or transferring the file 123 on the removable media 123 to the magnetic disk 106, the label management program 109 adds the file name 1401, the security level 1402, the settlor level 1403 and the settlor ID 1404 of the file 124 to the security level control list 1400, and thus stores the file 124 in the magnetic disk 106.

Now, the process of transmitting the file at the client terminal 101 according to this embodiment will be explained with reference to FIG. 9.

In step 901, the application program 103 issues a request to transmit the file 107. According to this embodiment, prior to proceeding to step 902, a step is added for the label management program 109 to acquire the security level 202 of the file 107 and thereby to prepare a labeled file. The subsequent process is similar to that of the first embodiment, so that the process proceeds to step 902, in which the label management program 109 converts the transmission request of the file 107 to the transmission request of the labeled file 107.

In step 903, the protocol driver 110 divides the packet and prepares a packet header.

In step 904, the network adapter driver 111 transmits the file 107 outside through a LAN controller.

Upon generation of a request to delete the file 107, the label management program 109 transmits a request to delete the file 107 to the file system driver 104, and after receiving from the file system driver 104 a message to the effect that the file 107 has been successfully deleted, deletes the row of the file 107 from the security level control list 1400.

Upon receipt of the file 107 from another client terminal 101 or the gateway server 118, the label management program 109 checks the label attached to the head of the file 107 and registers the label information of the file 107 in the security level control list 1400. After that, the label management program 109 delivers the file 107 to the application program 103.

The security level 202 of the file 107 is changed in such a manner that the label management program 109 receives a request to change the security level 202 of the file 107 from the security level change program 108 and then changes the security level control list 1400. Specifically, the processing flow shown in FIG. 10 is followed except that the security level control list 1400 is used.

According to the first or second embodiment, the security level 202 is set in the file 107 and thereby the information flow can be controlled in the network.

Third Embodiment

Now, an explanation will be given of a third embodiment capable of guaranteeing the legitimacy of the label and preventing the illegal alteration of the label.

According to this embodiment, it is possible to prevent the illegal act in which a third party alters a label illegally and thus hides a person who has actually altered the label. As a specific example, an illegal act can be prevented in which a third party A alters a label illegally from the file 107 labeled "confidential" to a file labeled "unclassified", and further sets the settlor ID to the ID of another person B to show as if B has changed the security level. In this way, should the file 107 labeled "confidential" leak outside, the innocent B is prevented from being persecuted for the act.

Figure 14:
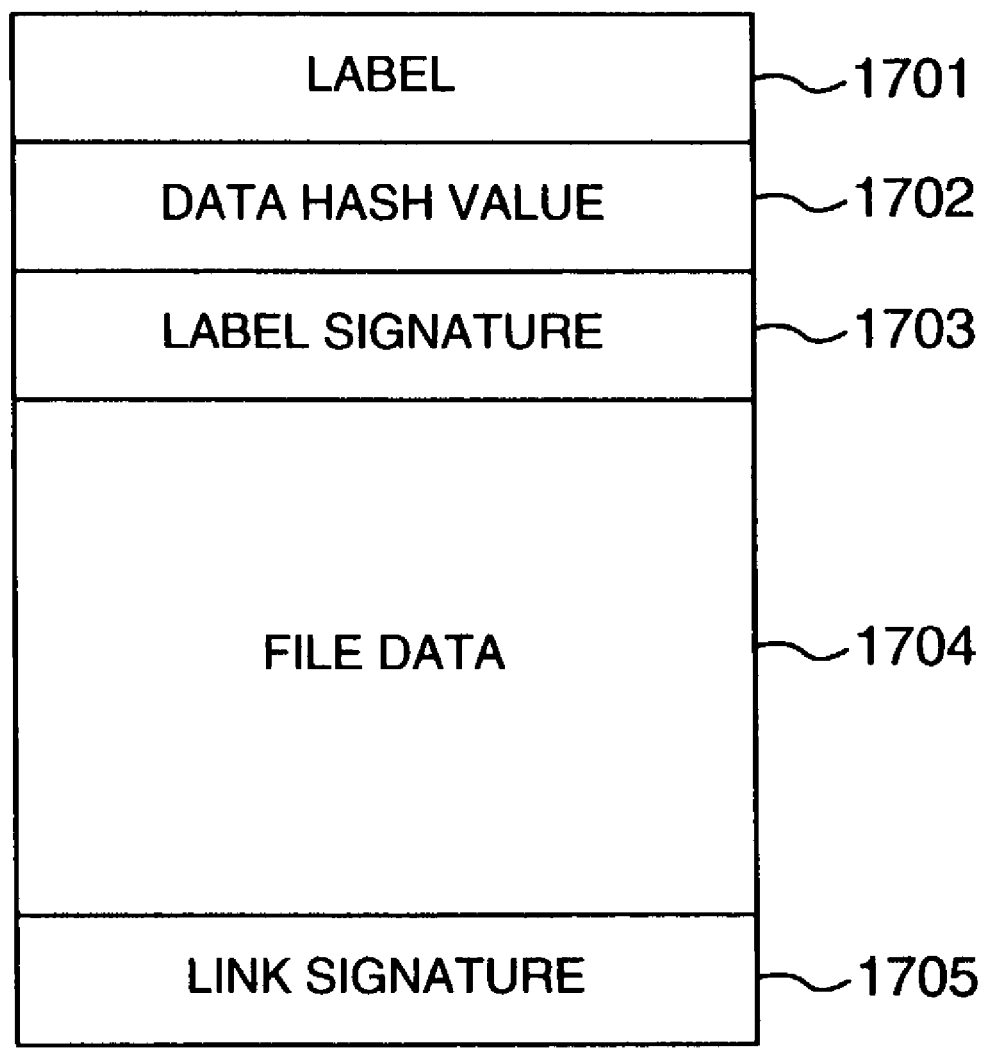
FIG. 14 is a diagram showing a structure of a labeled file according to a third embodiment of the invention.

FIG. 14 is a diagram showing a structure of the labeled file 107 used in this embodiment. The labeled file 107 includes a label 1701 at the head thereof, followed by a data hash value 1702, a label signature 1703, a file data 1704 and a link signature 1705.

The data hash value 1702 is that of the file data as of the time point when the settlor himself of the security level 202 prepares or corrects the file 107 or changes the security level 202. The label signature 1703 is a digital signature attached by the settlor of the security level 202 for the label 1701 and the data hash value 1702. The link signature 1705, on the other hand, is a digital signature attached by the person who has prepared or changed the file data 1704 for the label 1701 and the file data 1704.

The label signature 1703 guarantees the legitimacy of the label 1701, while the link signature 1705 guarantees the legitimacy of the file data 1704 and the legitimacy of the link between the file data 1704 and the label 1701. The use of the label signature 1703 and the link signature 1705 is effective for the investigation as to where the responsibility lies for any information leakage which may occur, while at the same time suppressing the illegal information leakage as the evidence is left. A different confidential key for the signature is desirably held by each different user.

This embodiment can be used as an extension of the first embodiment, in which case the file structure described above is used in and outside the client terminal 101. In the case where this embodiment is used as an extension of the second embodiment, on the other hand, the file structure is used outside the client terminal 101, while the column of the data hash value 1702, the label signature 1703 and the link signature 1705 is added to the security level control list 1400 within the client terminal 101, thereby assuring the legitimacy of the label information.

Now, this embodiment will be explained as an extension of the second embodiment of the invention.

Figure 15:
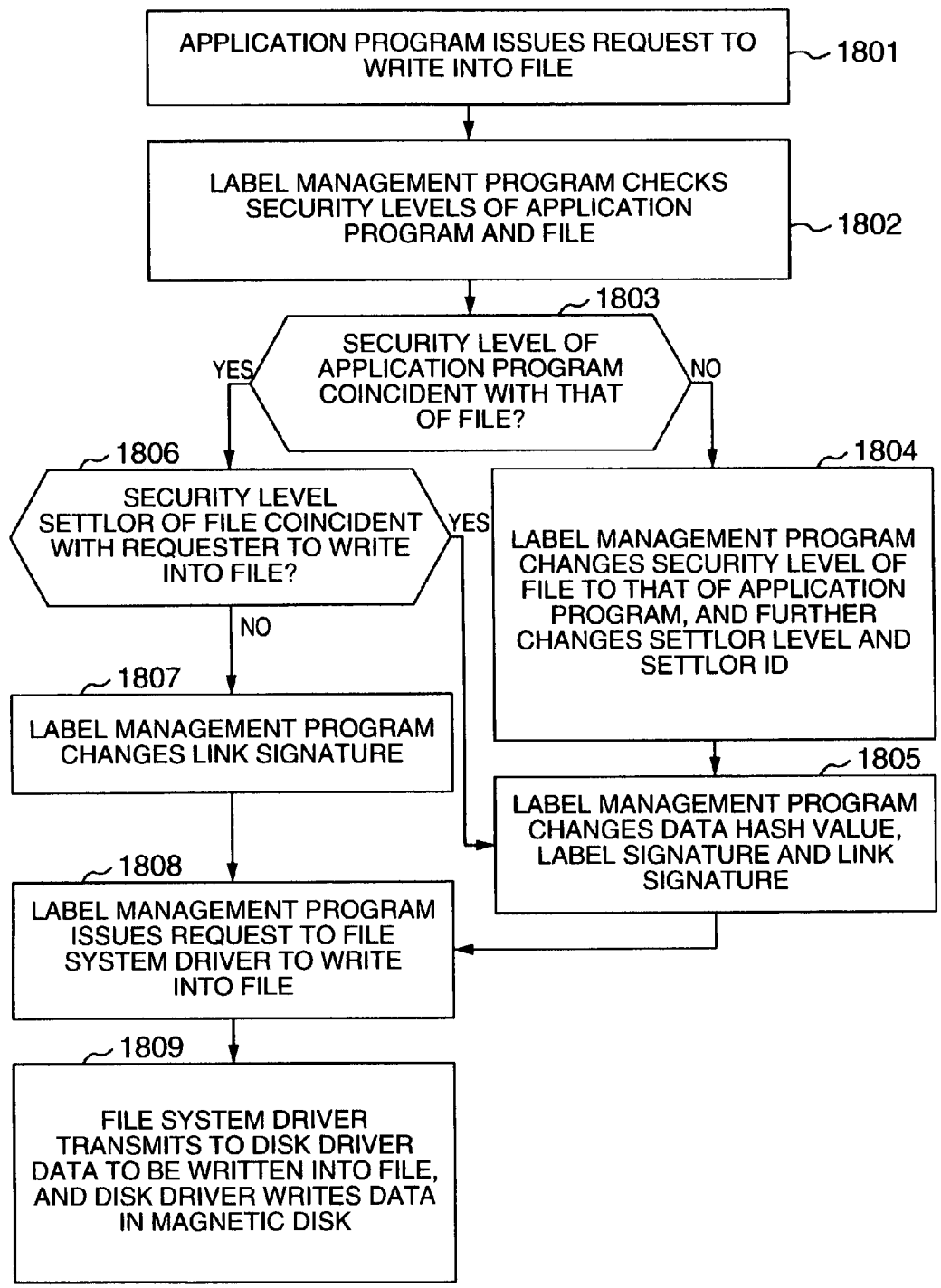
FIG. 15 is a flowchart for performing the process of writing into a file according to the third embodiment of the invention.

FIG. 15 is a flowchart for performing the process of writing data (file data 1704) into the file 107 according to this embodiment.

In step 1801, the application program 103 issues a request to write the data (file data 1704) into the file 107.

In step 1802, the label management program 109 checks, with reference to the process management list 400 and the security level control list 1400, whether the security level 402 of the application program 103 coincides with the security level 202 of the file 107.

In the case where the security level 202 of the application program 103 coincides with that of the file 107 in step 1803, the process proceeds to step 1806, otherwise the process proceeds to step 1804.

In step 1804, the label management program 109 changes the security level 202 of the file 107 to the security level 402 of the application program 103, and further changes the settlor level 203 and the settlor ID 204. In step 1805, the label management program 109 newly determines the data hash value 1702, the label signature 1703 and the link signature 1705, and then proceeds to step 1808. Under this condition, the data hash value 1702 is that of the file data 1704 after the change, and the label signature 1703 and the link signature 1705 the signature of the party requesting to write into the file 107.

In step 1806, the label management program 109 checks whether the settlor of the security level 202 of the file 107 coincides with the party requesting to write into the file 107, and in case of coincidence, the process proceeds to step 1805, otherwise the process proceeds to step 1807.

In step 1807, the label management program 109 newly determines the link signature 1705, which is the signature of the party requesting to write into the file 107.

In step 1808, the label management program 109 issues a request to the file system driver 104 to write the newly acquired one of the data hash value 1702, the label signature 1703 and the link signature 1705 together with the file data 1704 into the file 107.

In step 1809, the file system driver transmits the data to be written into the particular file, to the disk driver, which in turn writes the data in the magnetic disk.

An explanation will be made about the process performed at the client terminal 101 for transmitting the labeled file 107. First, the label management program 109 receives a file transmission request from the application program 103. Then, the label management program 109 converts the file transmission request from the application program 103 to the transmission request for the labeled file 107. Specifically, the file structure transmitted from the client terminal 101 is identical to the structure shown in FIG. 14.

Figure 16:
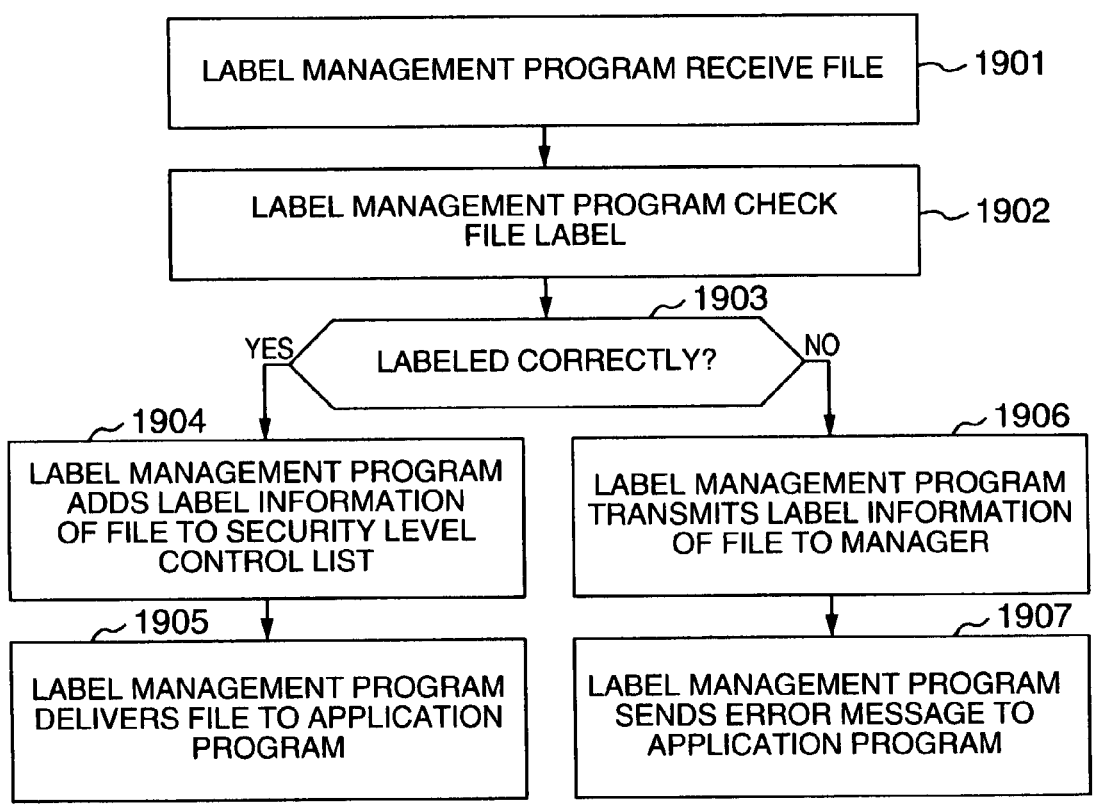
FIG. 16 is a flowchart for performing the process of receiving a file at a client terminal.

FIG. 16 is a flowchart showing the process for performing the file receive operation at the client terminal 101 according to this embodiment.

In step 1901, the label management program 109 receives the labeled file 107.

In step 1902, the label management program 109 checks the label 1701 of the labeled file 107. In the process, the label management program 109 verifies the legitimacy of the label 1701 based on the label signature 1703, and checks for the completeness of the file data 1704 and the legitimacy of the link between the file data 1704 and the label 1701 based on the link signature 1705.

From step 1903, the process proceeds to step 1904 in the case where the result of the check in step 1902 shows that the label 1701, the file data 1704 and the link between the file data 1704 and the label 1701 are correct, otherwise the process proceeds to step 1906.

In step 1904, the label management program 109 adds the label information of the labeled file 107 to the security level control list 1400.

In step 1905, the label management program 109 delivers the labeled file 107 to the application program 103.

In step 1906, the label management program 109 transmits the label information of the labeled file 107 to the manager.

In step 1907, the label management program 109 sends an error message to the application program 103.

Now, the process performed for changing the "confidential" labeled file 107 to an "unclassified" file according to this embodiment will be explained with reference to FIG. 10.

In step 1001, the security level change program 108 issues a request to change the security level 202 of the labeled file 107 from "confidential" to "unclassified".

In step 1002, the label management program 109 acquires the settlor ID 204 of the labeled file 107 from the security level control list 1400 according to this embodiment.

In step 1003, it is determined whether the settlor ID 204 acquired in step 1002 is coincident with the changer ID of the security level 202. In the case of coincidence, the process proceeds to step 1004, otherwise the process proceeds to step 1005.

In step 1004, the label management program 109 changes the security level 202 of the labeled file 107 to "unclassified", while at the same time changing the settlor ID 204 and the settlor level 203. According to this embodiment, the label management program 109 further performs the process for newly acquiring the label signature 1703 and the link signature 1705.

The process including and subsequent to step 1005 is similar to that of the first embodiment. In step 1005, it is determined whether the changer of the security level 202 is authorized to change the security level 202 or not. In the case where the changer is so authorized, the process proceeds to step 1004, otherwise the process proceeds to step 1006.

In step 1006, the label management program 109 delivers an error message to the security level change program 108.

This embodiment is described above referring to a case in which the security level 202 is changed from "confidential" to "unclassified". Nevertheless, the security level 202 can be reduced by the same method also in the case where the security level 202 includes three levels.

Figure 17:
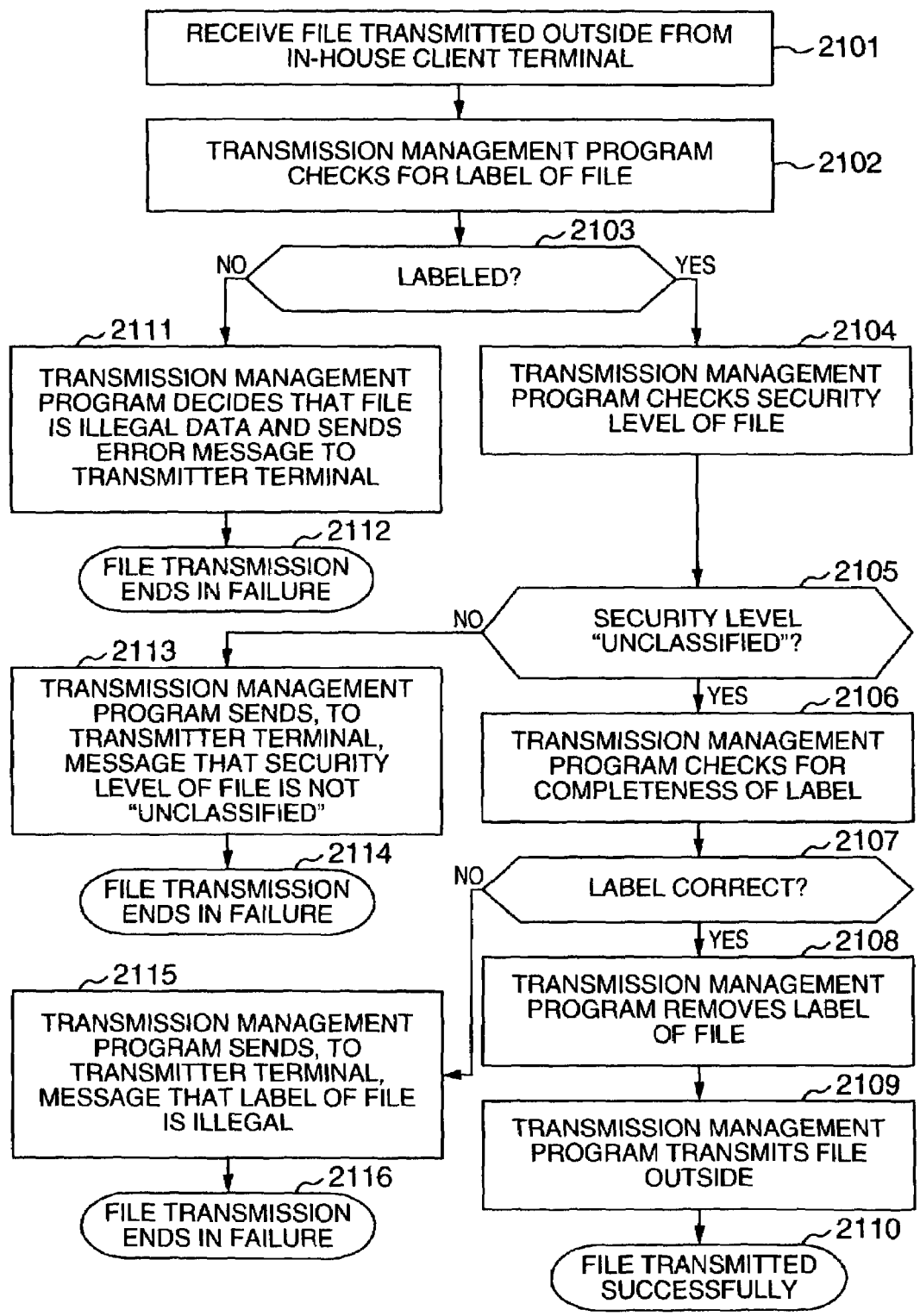
FIG. 17 is a flowchart for performing the process of checking the label at a gateway server according to the third embodiment of the invention.

FIG. 17 is a flowchart for performing the process of checking the label 1701 at the gateway server 118 according to this embodiment.

In step 2101, the file 107 transmitted outside of the in-house client terminal 101 is received.

In step 2102, the transmission management program 119 checks whether the label 1701 for the file 107 is present or not.

In step 2103, the process proceeds from step 2103 to step 2104 in the presence of the label 1701, otherwise the process proceeds to step 2111.

In step 2104, the transmission management program 119 checks the security level 202 of the labeled file 107.

In step 2105, the process proceeds to step 2106 if the security level 202 is "unclassified", otherwise the process proceeds to step 2113.

In step 2106, the transmission management program 119 checks whether the label 1701 is complete or not. In the process, the transmission management program 119 verifies the legitimacy of the label 1701 based on the label signature 1703, and checks both the completeness of the file data 1704 and the legitimacy of the linkage between the file data 1704 and the label 1701 based on the link signature 1705.

From step 2107, the process proceeds to step 2108 in the case where the check in step 2106 shows that the linkage is legitimate, otherwise the process proceeds to step 2115.

In step 2108, the transmission management program 119 removes the label 1701, the data hash value 1702, the label signature 1703 and the link signature 1705 from the labeled file 107.

In step 2109, the transmission management program 119 transmits the file 107 outside.

In step 2110, the file is transmitted successfully.

In step 2111, the transmission management program 119 determines that the file 107 is illegal data, and sends an error message to the transmitter terminal.

In step 2112, the file transmission ends in failure.

In step 2113, the transmission management program 119 sends to the transmitter terminal a message to the effect that the security level 202 of the labeled file 107 is not "unclassified".

In step 2114, the file transmission ends in failure.

In step 2115, transmission management program 119 sends to the transmitter terminal a message to the effect that the label of the labeled file 107 is illegal.

In step 2116, the file transmission ends in a failure.

Also, the transmission management program 119 may store all the contents of the transmitter information and the transmittee information and the transmission file (the file having the label 1701, the data hash value 1702, the label signature 1703 and the link signature 1705) in a log.

According to this embodiment, in the case where the gateway server 118 receives the file 107 transmitted toward the client terminal 101 from the external network 121, the receiving management program 120 attaches the "unclassified" label to the file 107 and transmits the file 107 to the client terminal 101. In this case, the label settlor ID 204 is set to the ID of the gateway server 118, and the settlor level 203 is set to the lowest level. Also, the label signature 1703 and the link signature 1705 constitute the signature by the gateway server 118.

Further, the receiving management program 120 may store in a log the transmitter information, the transmittee information of the file 107 and all the contents of the received file.

Fourth Embodiment

A fourth embodiment of the invention will be explained.

Various application programs 103 operate on a general-purpose computer. Also, various devices are connected and therefore the device drivers for operating these devices are in operation. As a result, in the case where each of the embodiments described above is implemented with a general-purpose computer, a bug of the application program 103 or the device driver and the operating error of the user may cause a change or a deletion of the label information (the security level control list 1400), the label management program 109 and the process management list 400. According to this embodiment, such an inconvenience can be avoided.

Figure 18:
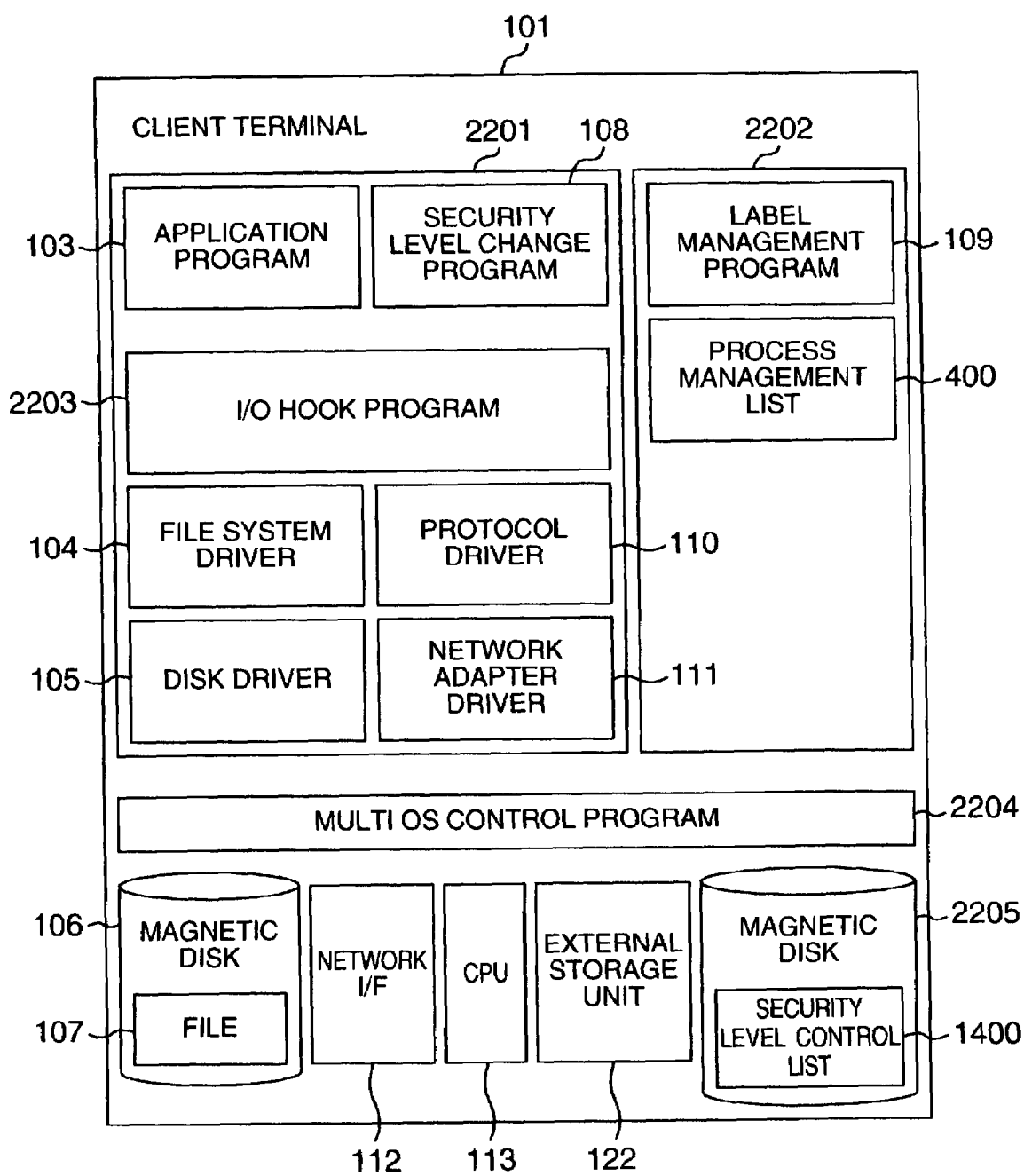
FIG. 18 is a diagram showing a configuration of a client terminal of a network system according to this invention using two operating systems.

FIG. 18 shows an example of a configuration of the client terminal 101 according to this embodiment. By replacing this client terminal with the client terminal 101 shown in FIG. 1 and using each of the embodiments described above, the aforementioned effect of this embodiment can be achieved.

Two operating systems are working in the client terminal 101, which has a memory area 2201 managed by the first operating system and a memory area 2202 managed by the second operating system. Further, a multi OS control programs 2204 for controlling the two operating systems are in operation. A multi OS control technique is disclosed in JP-A-11-149385.

Also, the memory area 2201 managed by the first operating system has loaded therein an application program 103, a security level change program 108, an I/O hook program 2203, a file system driver 104, a disk driver 105, a protocol driver 110 and a network adapter driver 111. Further, the first operating system manages the magnetic disk 106 and the network I/F 112, and the file 107 is stored in the magnetic disk 106.

The label management program 109 and the process management list 400 are stored in the memory area 2202 managed by the second operating system. Also, the second operating system manages the magnetic disk 2205, which has stored therein the security level control list 1400.

The I/O hook program 2203 hooks the request for access to the file 107 from the application program 103 or the security level change program 108 or the request for transmission/receiving of the file 107. Further, the I/O hook program 2203 has the function of requesting the processing of the label management program 109 and the function of receiving the result of processing of the label management program 109 and delivering the result of the processing to the file system driver 104 or the protocol driver 110. Specifically, the I/O hook program 2203 requests the processing of the label management program 109 utilizing the function of communication between the operating systems of a multi OS control programs 2204. The function of communication between the operating systems is disclosed, for example, in JP-A-11-85546.

According to this embodiment, the objects to be protected (label management program 109, the process management list 400 and the security level control list 1400) are managed by the second operating system, so that protection is possible from the change due to the bug of the application program 103 or the device driver operating on the first operating system or the operating error of the user.

Miscellaneous

According to each of the embodiments described above, not only the leakage of the in-house confidential information is prevented but also the leakage of the confidential information which otherwise might be caused by the illegal intrusion through the external network 121 can be prevented. In the case where an illegal intruder attempts to take away a confidential file from the client terminal 101 through the gateway server 118, the transmission management program 119 of the gateway server 118 checks the label of the particular confidential file. In the case where the security level is "confidential", the transmission management program 119 rejects the transmission outside and therefore the leakage of the confidential file can be prevented.

Also, the label management program 109 can attach a label "Untrusted" on an untrusted program (such as a program accompanying the mail) thereby to limit the files accessible.

Specifically, the "Untrusted" label is attached on a system file or a set information file of the kernel, so that in the case where the "Untrusted" program accesses a "Trusted" file, the label management program 109 limits the access. This function can be realized by the label management program 109 checking the program and the file label when the file is open. By use of this function, the effect that a computer virus has on the system can be minimized.

Also, communication can be carried out between the client terminal 101 and the gateway server 118 by use of a dedicated communication protocol. As a result, a label is attached on the header area of each packet, and the transmission management program 119 of the gateway server 118 checks the label in the header area of the packet thereby to determine whether the data can be transmitted or not. In the case where the dedicated communication protocol is used for transmission of data to the external network 121, the transmission management program 119 removes the label and converts it into a general-purpose communication protocol (TCP/IP, etc.).

Also, the labeled file 107 is attached to the file attached to the electronic mail and transmitted, and the gateway server 121 checks the label of the file accompanying the mail, thereby making it possible to prevent the confidential file from leaking outside through electronic mail. As for the text of the mail, the leakage can be prevented by checking, using the keyword search, to see whether any keyword against the policy is included or not.

Also, a security level is set for each client terminal 101, and further an intermediate server is provided between the client terminals 101 on the one hand and between each client terminal 101 and each server on the other, so that the intermediate server may be equipped with the function of preventing the leakage of the information. In this case, the label need not be attached to the file 107 on the client terminal 101.

In this case, the intermediate server manages the security level of each client terminal 101, and determines whether the file 107 transmitted by the client terminal 101 is allowed to be transmitted to another client terminal 101 or another department or group. No label is attached in the case where the intermediate server transmits the file 107 directly to the client terminal 101, but the label is attached in the case where the file 107 is transmitted to the intermediate server of another department or group. The intermediate server checks the label of the file 107 received from another intermediate server, and when transmitting the file 107 to the client terminal 101, removes the label. The intermediate server may be arranged for each department or group.

By doing so, the label management program 109 is not required to be incorporated in each client terminal 107, thereby making it possible to save the labor and trouble for introducing the function of information leakage prevention.

Thus, there is provided a system capable of preventing the leakage of a confidential file having an arbitrary format.

It should be further understood by those skilled in the art that the foregoing description has been made on embodiments of the invention and that various changes and modifications may be made in the invention without departing from the spirit of the invention and the scope of the appended claims.

The invention claimed is:

1. A network system connected to an in-house network and capable of controlling transmission, comprising a transmission/receiving terminal having means for transmitting/receiving data and repeater means for relaying the data transmitted/received between said transmission/receiving terminal and said in-house network, wherein:

said data includes information proper and additional information associated with said information proper;

said repeater means includes means for controlling the data transmission from said transmission/receiving terminal using said additional information, and means for removing said additional information from data transmissible outside of said in-house network; and said repeater means includes:

a transmission permit list of transmittees external to said in-house network to which said transmission/receiving terminal is permitted to transmit data;

means for encrypting the data to be transmitted by said transmission/receiving terminal;

means for receiving the data to be transmitted by said transmission/receiving terminal;

means for determining whether said data is to be transmitted, with reference to said transmission permit list;

means for encrypting said data of which the transmission is permitted; and means for transmitting said encrypted data outside of said in-house network.

2. A network system connected to an in-house network and capable of controlling transmission, comprising a transmission/receiving terminal having means for transmitting/receiving data and repeater means for relaying the data transmitted/received between said transmission/receiving terminal and said in-house network, wherein:

said data includes information proper and additional information associated with said information proper;

said repeater means includes means for controlling the data transmission from said transmission/receiving terminal using said additional information, and means for removing said additional information from data transmissible outside of said in-house network; and said additional information includes information representing a security level of said information proper, a feature value of said information proper, a first digital signature for the information indicating said security level and said feature value, and a second digital value for the information indicating said security level and said information proper.

3. A network system connected to an in-house network and capable of controlling transmission, comprising a transmission/receiving terminal having means for transmitting/receiving data and repeater means for relaying the data transmitted/received between said transmission/receiving terminal and said in-house network; wherein:

said data includes information proper and additional information associated with said information proper;

said repeater means includes means for controlling the data transmission from said transmission/receiving terminal using said additional information, and means for removing said additional information from data transmissible outside of said in-house network;

said transmission/receiving terminal includes a first operating system, a second operating system and a multi OS control program, said program controlling said first and second operating systems;

said first operating system manages the application program handling said information proper; and said second operating system manages means for controlling access to said information proper using said additional information, and means for changing said additional information.

4. A network system capable of controlling transmission, comprising:

an information processing system including a first storage unit, a second storage unit for reading/writing data from and into removable media, means for accessing said first and second storage units, and an additional information list containing additional information to be added to each information proper; and a key management unit for managing an encryption key; wherein:

said access means includes means for recording the information proper from said first storage unit into said second storage unit; and said recording means includes means for determining whether said data is to be encrypted or not, by referring to the additional information of said information proper recorded in said additional information list, means for generating an encryption key in the case where said data can be encrypted, means for encrypting said data using said encryption key, means for registering said encryption key in said key management unit, means for receiving an identifier of said registered encryption key from said key management unit, means for generating data by adding said additional information to said information proper, and means for recording said encrypted data and said identifier in said second storage unit using said encryption key.

5. A network system capable of controlling transmission, comprising:

an information processing system including a first storage unit, a second storage unit for reading/writing data from and into removable media, means for accessing said first and second storage units, and an additional information list containing additional information to be added to each of said information proper; and a key management unit for managing an encryption key; wherein:

said access means includes means for recording the data from said second storage unit into said first storage unit;

said data includes an identifier and encrypted data;

said encrypted data includes an additional information section;

said recording means includes means for transmitting said identifier to said key management unit and receiving the encryption key for a corresponding one of said encrypted data, means for decrypting said encrypted data using said encryption key, and means for adding said additional information to said additional information list; and said key management unit includes means for receiving said identifier from said recording means and transmitting the encryption key associated with said encrypted data to said recording means.

6. A network system capable of controlling transmission, comprising:

an information processing system including a first storage unit, a second storage unit for reading/writing data from and into removable media, and means for accessing said first and second storage units; and a key management unit for managing an encryption key; wherein:

said access means includes means for recording the data from said first storage unit into said second storage unit;

said data includes information proper and additional information associated with said information proper;

said recording means includes means for determining whether said data is to be encrypted or not, based on said additional information, means for generating an encryption key, means for encrypting said data using said encryption key, means for registering said encryption key in said key management unit, means for receiving an identifier of said registered encryption key from said key management unit, and means for recording said encrypted data and said identifier into said second storage unit; and said key management unit includes means for receiving said encryption key from said recording means and transmitting said identifier associated with said encryption key to said recording means.

7. A network system capable of controlling transmission, comprising:

an information processing system including a first storage unit, a second storage unit for reading/writing data from and into removable media, and means for accessing said first and second storage units; and a key management unit for managing an encryption key; wherein:

said access means includes means for recording the data from said second storage unit into said first storage unit;

said data includes an identifier and encrypted data;

said recording means includes means for transmitting said identifier to said key management unit and receiving the encryption key for said encrypted data, and means for decrypting said encrypted data using said encryption key; and said key management unit includes means for receiving said identifier from said recording means and transmitting said encryption key associated with said encrypted data to said recording means.

8. A network system connected to an in-house network and capable of controlling transmission, comprising a transmission/receiving terminal having means for transmitting/receiving data and repeater means for relaying the data transmitted/received between said transmission/receiving terminal and said in-house network, wherein:

said data includes information proper and additional information associated with said information proper; and said repeater means includes means for controlling the data transmission from said transmission/receiving terminal using said additional information, and means for removing said additional information from data transmissible outside of said in-house network;

said additional information includes information representing an attribute of said information proper;

said repeater means includes means for holding a transmission policy corresponding to said attribute, and means for determining whether the data to be transmitted by said transmission terminal can be transmitted in accordance with said transmission policy;

said attribute is a security level;

said additional information further includes settler information for said security level and hierarchical information of the settler;

said transmission/receiving terminal includes means for changing said additional information; and said change means determines whether the security level of said data can be changed, with reference to the security level of the data of said additional information, the settlor information of said security level, the hierarchical information of said settlor, changer information of a person intending to change the additional information of said data and hierarchical information of said changer.

* * * * *